Oct. 17, 1967     T. M. WILLIAMS     3,347,148
SMOKE FLAVORING DEVICE
Filed June 20, 1966
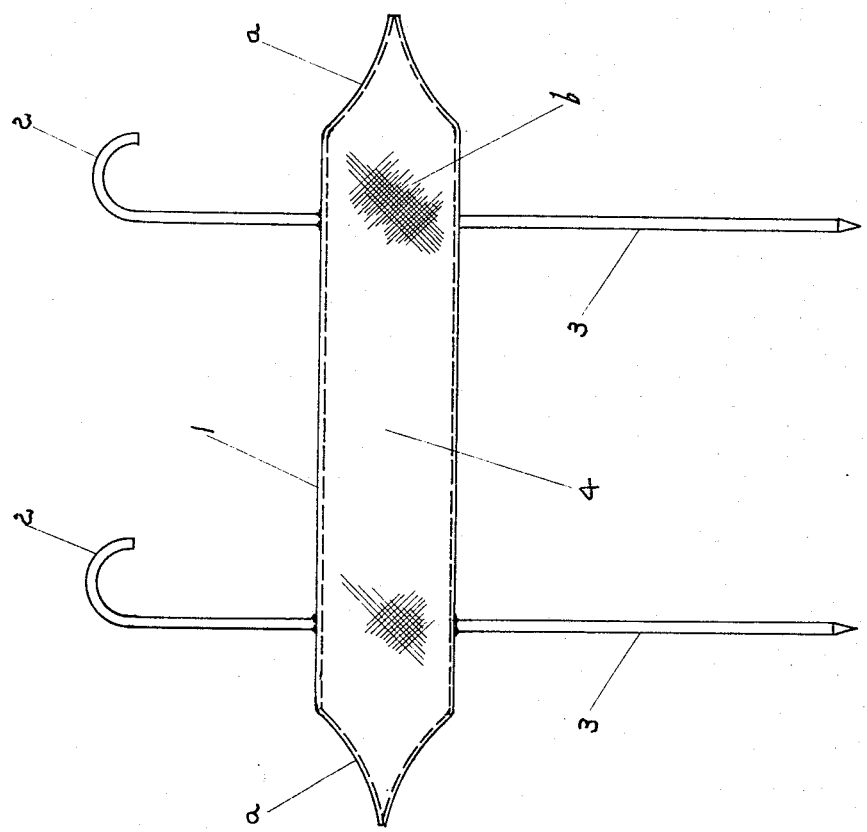
Theodore M Williams
INVENTOR

3,347,148
SMOKE FLAVORING DEVICE
Theodore M. Williams, Volusia County, Fla.
(600 White St., Daytona Beach, Fla. 32014)
Filed June 20, 1966, Ser. No. 558,797
1 Claim. (Cl. 99—259)

ABSTRACT OF THE DISCLOSURE

A device for smoke flavoring foods being cooked indoors comprising a perforated fireproof holder containing wood chips or the like and having support means for positioning the container in close proximity to the food and to a heat source, so that the food will be flavored by the smoke from the wood as it is charred.

---

This invention relates to flavoring food such as steak or roast normally cooked indoors in an oven and particularly to a device which will allow the cook to place these savory wood screen covered devices in the oven in reasonably close proximity to the electric or gas heat so the wood will char and give off a savory smoke imparting a desired flavor to the food being prepared without the burned charcoal falling on the food being cooked; being held in place by screen cover.

Another object of this invention is for the smoke flavoring device's metal pin with a hook at one end and a point at the other to be either stuck directly into the meat or other food, or be hooked by the hook at the opposite end over a rod on the rack; either method placing them sufficiently near the source of heat so that they will allow the wood shavings, chips or the like contained within the screen enclosure to char and burn without breaking into open flame, the closeness of mesh of the wire screen acting as a flame arrester.

A still further object of this invention is to provide a smoke flavoring device that will enable cooks to cook food indoors, with smaller amounts of controlled smoke that will impart the delicious barbequed flavor indoors without the inconveniences and bother of outdoor cooking.

Further objects and advantages of the present invention will appear from time to time as the description of the invention progresses.

It is believed that the invention will be understood most readily from a detailed description thereof taken in connection with the accompanying drawings in which:

FIGURE 1 is a side elevational view of the smoke flavoring device.

FIGURE 2 is an end elevational view of same device.

Referring now to the drawing in which like reference characters indicate the same parts in the two different views:

1 refers to the screen enclosure which in this particular drawing is a cylindrical tube of sufficient diameter and length to contain a desired amount of wood particles, oak, hickory, bay, or whatever is the desired type wood or flavoring material. 2 refers to a pin, or in this case two pins, shown containing a crook at one end and a straight round shank, 3, for main length as desired. At the opposite end a point serves to stick through the screen and wood filler, not shown. Item $a$ indicates the closures of the round hollow screen tube, one at each end. Item $b$ shows the wire screen, which will be of suitable mesh to serve its purpose of holding the wood filler in while at the same time permitting the heat to enter and make the wood smoke and serve as a flame arrester. 4 refers to the hollow section within the tube bounded on the inside by dotted lines which allows space for the wood filler. These drawings are for illustration of the basic idea, which could be made in many different forms and accomplish the same purpose.

It will be appreciated that the embodiment of this invention as herein described may be altered, changed or modified without departing from the spirit or scope of this invention as herein claimed.

What I claim is:

A device for imparting smoke flavoring to foods being cooked indoors, comprising a hollow container adapted to contain heat responsive smoke producing means and formed of a fire-proof mesh wire fabric material of a gauge to permit charring of the smoke producing means but to prevent ignition thereof, and two elongated rigid supporting elements extending through and anchored in the container and having support engaging end portions disposed above and beneath the container and adapted to engage supports for supporting the container in close proximity to food being cooked and to a heat source, the upper end portions of the supporting elements comprising rack engaging hooks and the lower end portions of the supporting elements comprising points adapted to be anchored in the food.

References Cited

UNITED STATES PATENTS

| | | | |
|---|---|---|---|
| 1,744,022 | 1/1930 | Davis | 43—131 |
| 1,820,794 | 8/1931 | Giguere | 206—0.5 |
| 2,085,991 | 5/1936 | Minor | 99—258 X |
| 2,262,910 | 11/1941 | Aller | 99—259 |
| 2,611,311 | 9/1952 | Irwin | 99—259 |
| 2,967,023 | 1/1961 | Huckabee | 99—259 X |
| 3,088,393 | 5/1963 | Huckabee. | |
| 3,303,599 | 2/1967 | Ballard | 43—131 |

FOREIGN PATENTS

| | | | |
|---|---|---|---|
| 323,864 | 8/1920 | Germany | 99—259 |

WALTER A. SCHEEL, *Primary Examiner.*

J. M. NEARY, *Assistant Examiner.*